Oct. 29, 1968

K. E. MYATT 3,407,454

QUICK RELEASE FASTENERS

Filed April 28, 1967

INVENTOR:

KEITH ERNEST MYATT

BY Kurt Kelman

AGENT

Oct. 29, 1968           K. E. MYATT           3,407,454

QUICK RELEASE FASTENERS

Filed April 28, 1967           5 Sheets-Sheet 2

INVENTOR:
KEITH ERNEST MYATT
BY Kurt Kelman
AGENT

Oct. 29, 1968    K. E. MYATT    3,407,454
QUICK RELEASE FASTENERS
Filed April 28, 1967    5 Sheets-Sheet 3
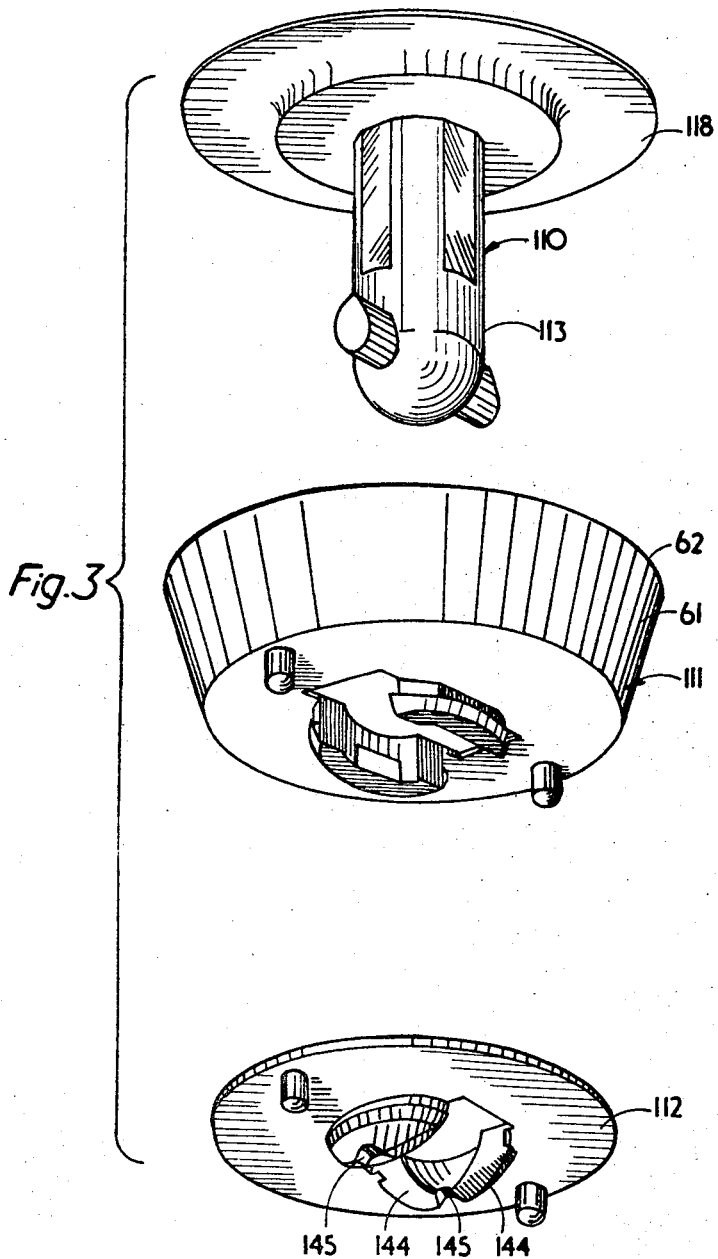
INVENTOR:
KEITH ERNEST MYATT
BY Kurt Kelman
AGENT

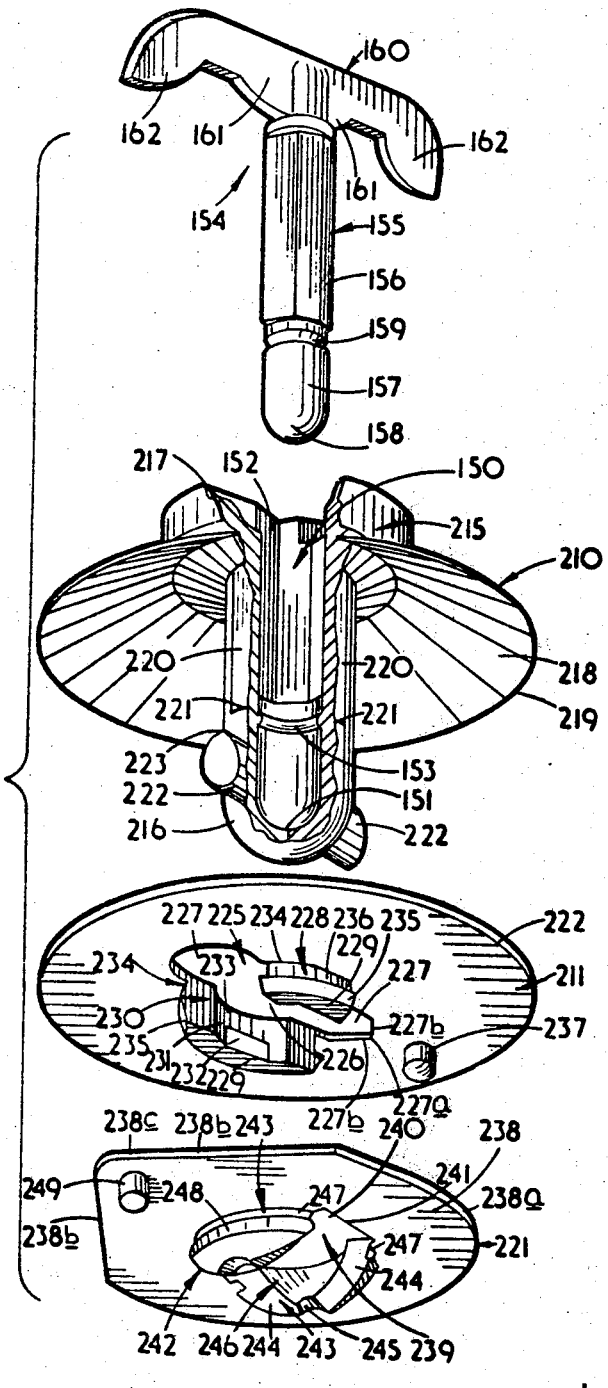

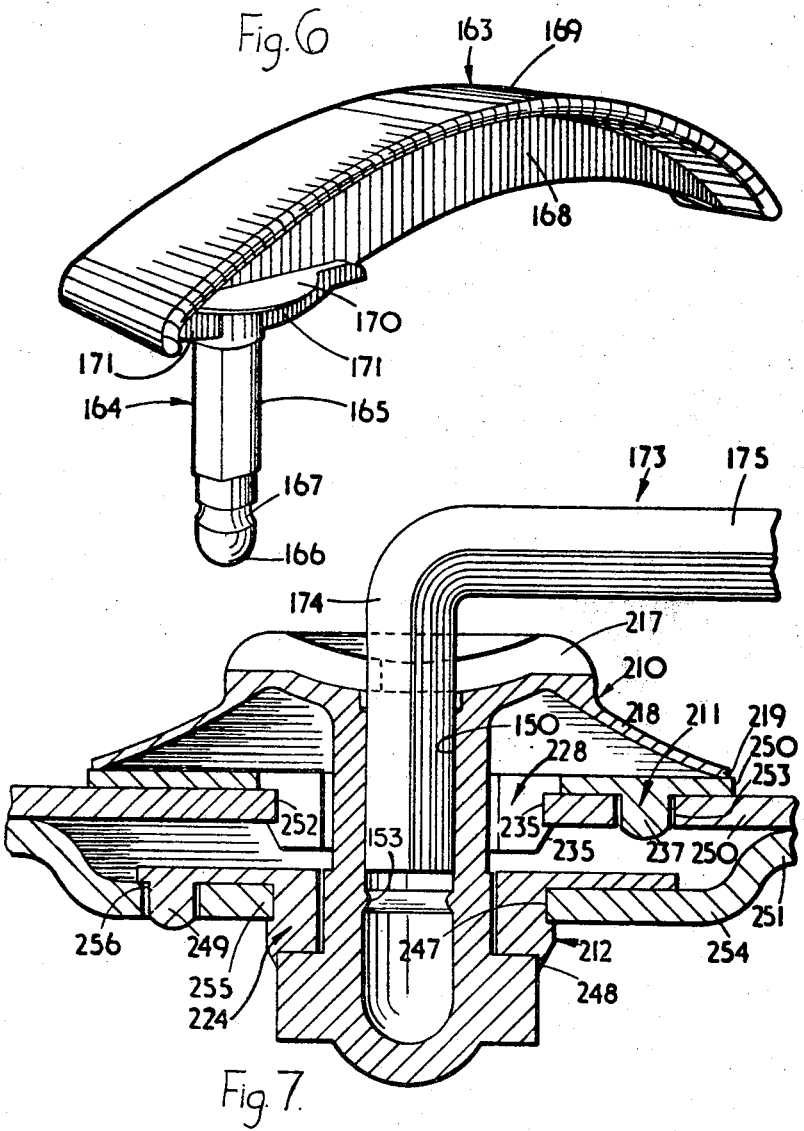

United States Patent Office 3,407,454
Patented Oct. 29, 1968

3,407,454
QUICK RELEASE FASTENERS
Keith E. Myatt, 6 Brookwillow Road, Hayley Green, Halesowen, Birmingham, England
Continuation-in-part of application Ser. No. 585,991, Oct. 11, 1966. This application Apr. 28, 1967, Ser. No. 641,092
Claims priority, application Great Britain, Apr. 23, 1966, 17,866/66; Feb. 17, 1967, 7,576/67
23 Claims. (Cl. 24—221)

ABSTRACT OF THE DISCLOSURE

The specification discloses various forms of three-piece quick release fasteners adapted releasably to hold together relatively thin sheets of material in face-to-face relationship, at least two pieces of the fastener being made of resilient synthetic resinous material and each being arranged to snap into a hole in one of the sheets, the third piece passing through holes in the other two pieces and holding them together by cam action as the third piece is turned.

*Cross-references to related applications*

This application is a continuation-in-part of my application Ser. No. 585,991, filed Oct. 11, 1966, now abandoned.

*Background of the invention*

In many industries, for example, in the aircraft industry, it is necessary to provide panels of relatively thin sheet material which may be quickly and easily removed so as to give access to the backs of instruments, electric cable conduits and the like. Moreover, in the motor industry, it is necessary to provide similar panels which may be easily removed. Such panels must be provided with fasteners which, in addition to holding the panel firmly in position, are also capable of being fastened and unfastened from one side of the panels.

A number of such quick release fasteners are already known which comprise a turn piece to be carried by one of the sheets to be connected and a cam piece carried by the other sheet. In many instances the cam piece has been fixed to the said other sheet by rivets or by a threaded collar. It has also been proposed to use press tools to fix the cam to its supporting sheet.

*Summary of the invention*

It is an object of the present invention to provide a simple but effective quick release fastener made from resilient, synthetic resinous material.

It is a further object of the invention to provide a quick release fastener in which the cam piece may be snapped into position on its supporting sheet so that no rivetting is required and so that screw threaded means are not required to hold the cam piece in position.

It is a further object of the invention to provide a quick release fastener comprising three pieces, a retaining piece which may be snapped into position on one of the sheets to be joined together, a cam piece which may be snapped into position on the other of the sheets which is to be joined together and a turn piece carried by the retaining piece. Preferably, all these pieces are made from resilient, synthetic resinous material.

It is a further object of the invention to provide a quick release fastener in which the retaining piece may hold the turn piece in a position so as to be readily engageable with the cam piece when the two sheets are offered up to one another.

According to the invention, there is provided a releasable fastener for holding together apertured first and second sheets in face-to-face relation and comprising a retaining piece to be mounted on the first sheet, a turn piece carried by the retaining piece and a cam piece to be mounted on the second sheet for engagement by the turn piece; the turn piece comprising a shank, a head at one end of the shank for engaging the retaining piece, and at least one locking projection, comprising locking means, extending outwardly from the shank adjacent the other end thereof; the retaining piece and the cam piece each consisting of a single piece of resilient, synthetic resinous material which presents a flange having a hole therein which has a central portion dimensioned to give passage to said shank and a lateral portion dimensioned to give passage to said locking means, a slotted member projecting from the flange and providing a split bushing with the bore of said bushing in alignment with said central portion and the slot in the member in alignment with said lateral portion, a groove in the outer surface of the bushing between the flange and the end of the bushing remote therefrom, the parts of the bushing being capable of being sprung towards one another so that said end may be sprung through an aperture in the sheet on which the piece is carried and the edge of said aperture received in the groove, and lug means on the flange for engaging means of said sheet to prevent the piece rotating relative thereto when mounted thereon; the cam piece additionally having a cam surface on the end of said slotted member remote from the flange and inclined to the longitudinal axis of the shank to engage the locking means after the latter have entered the slot in said member and the turn piece has been subsequently turned, engagement of the locking means with the cam surface drawing the shank of the turn piece into said bore, and spring means being provided to resist drawing of the shank into the bore.

In operation, the retaining piece and the cam piece are mounted on their respective sheets by snapping the slotted member on each piece into an aperture in its associated sheet. Due to the fact that each piece is made of resilient material and the fact that the member is split, it can be pushed through the aperture and will then expand so that the edge of the aperture is received in the groove in the external surface of the member. It is unnecessary, therefore, to provide any rivets or screw threaded members for mounting either the retaining piece or the cam piece on their associated sheets.

Preferably, in all embodiments, the spring means comprises a conical skirt on the head of the turn piece which engages the retaining piece, and is deformed as the turn piece is caused to engage with the cam surface thus applying a spring force. Preferably, the turn piece and the skirt are made from a single piece of resilient synthetic resinous material.

*Brief description of the drawings*

Various embodiments of the invention will now be described in detail by way of example with reference to the accompanying drawings in which:

FIGURE 3 is a view similar to FIGURE 1 of a second embodiment of the invention;

FIGURE 5 is a view similar to FIGURE 1 showing a third embodiment of the invention associated with a first type of handle member;

FIGURE 6 is a perspective view of an alternative form of handle member;

FIGURE 7 is a section through the fastener of FIGURE 5 when in use securing two sheets together in face-to-face relation and showing the bore in the turnpiece engaged by the end of a hexagon key.

*Description of preferred embodiments*

Figure 1:
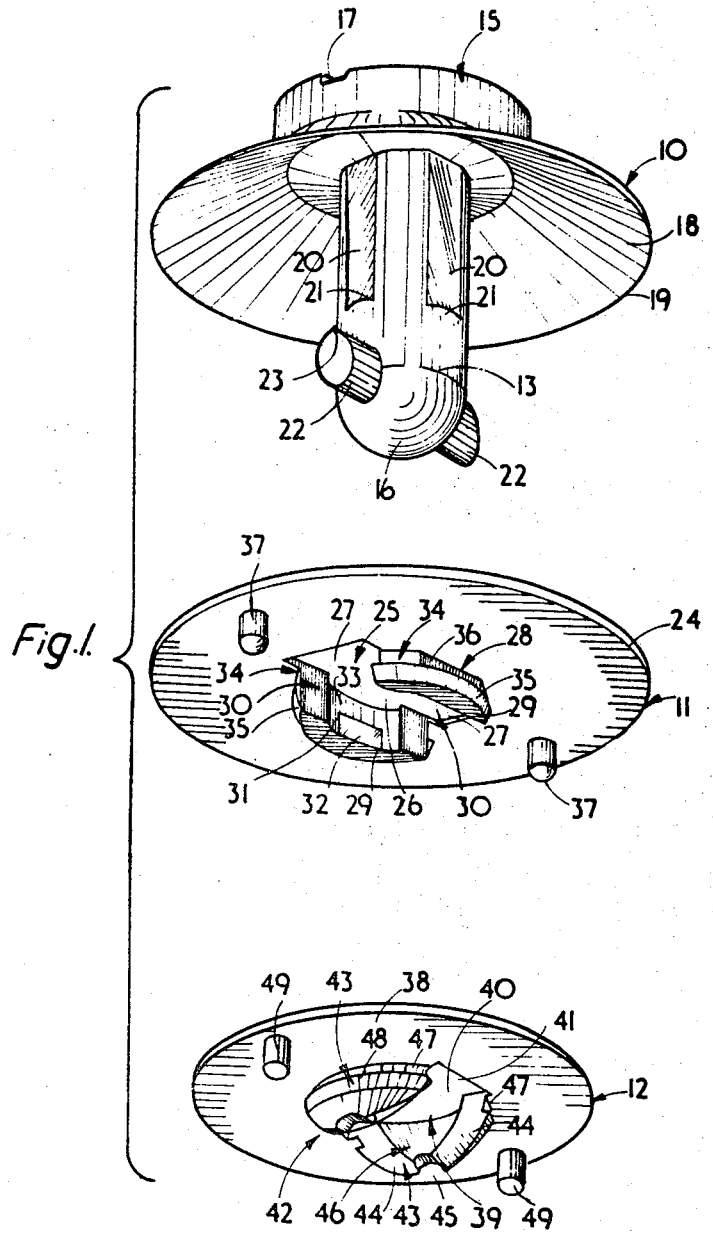
FIGURE 1 is a perspective view of the three pieces of a fastener constituting one embodiment of the invention.

Referring now to FIGURE 1, the fastener comprises a turn piece indicated generally at 10, a retaining piece indicated generally at 11 and a cam piece indicated generally at 12. Each of these pieces is made from a single piece of of resilient, synthetic resinous material.

The turn piece 10 comprises a generally cylindrical shank 13 having at one end a head 15 and being rounded at its other end 16. The head 15 includes a cross slit 17 for engagement by a screw driver or coin. Depending from the head 15 is a conical skirt 18 having a lower edge 19. The skirt is sufficiently thin to be able to be deformed when the fastener is in use as will be described below and acts as spring means.

The shank 13 is formed, at its upper portion, with flats 20. There are two pairs of flats, the flats of each pair being arranged at the ends of a diameter of the shank and the two diameters being at right angles; in FIGURE 1 there is shown one flat of each such pair. The flats extend from the head 15 and terminate adjacent the end 16 in shoulders 21.

Projecting from the shank 13 adjacent the end 16 are two locking projections 22 which together provide locking means. As will be seen, the projections are generally pear-shaped in cross section with the apex 23 of the pear directed uppermost. This shape is adopted for ease in moulding although the projections could be of circular section if desired.

Turning now to the retaining piece, this comprises a flange 24 having a central hole 25 therein. The hole has a central portion 26 which is part-circular and is of a size to receive the shank 13 of the turn-piece. The hole 25 also includes two lateral portions 27 lying on diametrically opposite sides of the central portion 26 and these lateral portions are of a size such as to give passage to the locking projections 22 thus enabling the turn-piece to pass through the hole 25.

Depending from the flange 24 is a slotted member indicated generally at 28 and comprises two parts 29 separated by a slot 30. The slotted member 28 comprises a split bushing which has a bore 31 which reecives the shank of the turn-piece. Arranged in the bore 31 on each of the parts 29 is a flat 32 which projects from the cylindrical wall 33 of the part and these, as will be desccribed hereinafter, are complementary to the flats 20 on the turn-piece shank.

The external surface of each part 29 is provided with a groove 34 which lies between the flange 24 and a bevelled lip 35 on the part 29. The external surface of each part is cut away in the groove 34 to provide a flat 36 each of which is aligned with one of the flats 32. Depending from the flange 24 are a pair of lugs 37 which are in line with the ends of the lateral portions 27 of the central hole 25.

Turning now to the cam piece 12, this comprises a flange 38 having a central hole 39 which has a central part-circular portion 40 and two lateral portions one of which is indicated at 41, the lateral portions being diametrically opposed. The central portion 40 is dimensioned to give passage to the shank 13 of the turn-piece and the lateral portions 41 are dimensioned to give passage to the locking projections 22.

The cam piece also comprises a slotted member 42 comprising two parts 43 each of which is provided with two surfaces 44 which are separated by a semi-cylindrical detent 45. The slotted member 42 comprises a split bushing, somewhat similar to that of the retaining piece 11, the bore of the bushing being indicated at 46. Each part 43 is also provided with a groove 47 in its outer surface between the flange 38 and a bevelled lip 48. The flange 38 is also provided with two lugs 49 which are arranged on a diameter at right angles to the diameter containing the lateral portions 41.

Figure 2:
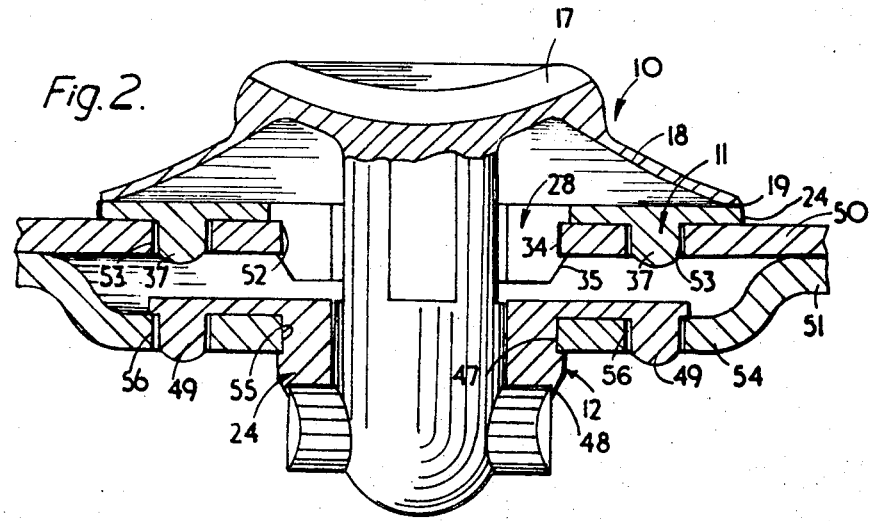
FIGURE 2 is a section through the fastener of FIGURE 1 when in use securing two sheets together in face-to-face relation.

Referring now to FIGURE 2, the fastener described above is shown in use as holding two plates 50 and 51 in face-to-face relation. The plate 50 is flat and is provided with a circular aperture 52 which receives the slotted member 28 on the retaining piece 11. The plate 50 is also provided with two smaller circular apertures 53 which receive the lugs 37 and thus prevent the retaining piece rotating relative to the sheet 50. It will be seen from FIGURE 2 that the edge of the aperture 52 is received in the groove 34 in the slotted member 28. The retaining piece is assembled on the sheet 50 by pushing the slotted member 28 into the aperture 52. The lip 35 is bevelled to assist its entry into the aperture and, due to the resilience of the material from which the retaining piece is made and the fact that the member 28 is slotted, the parts 29 can be sprung towards one another to enable the lip 35 to enter the aperture. The member may thus be snapped into position in the aperture and springs out after the lip 35 has passed through the aperture so that the edge of the aperture 52 is received in the groove 34. The retaining piece is thus mounted on the sheet 50 by being snapped into position and no tools or rivets are required.

The sheet 51 has a dished portion 54 in which the cam piece 12 is mounted. The dished portion has an aperture 55 through which the slotted member 42 of the cam piece is sprung. That is to say that the parts 43 are sprung towards one another to allow the bevelled lip 48 to be pushed through the aperture 55 and, when it has passed through the aperture, the slotted member springs out so that the edge of the aperture 55 is received in the groove 47. The portion 54 also has two small apertures 56 which receive the lugs 49 thus preventing rotation of the cam piece relative to the sheet 51.

In operation, the retaining piece is first snapped into position on the plate 50 as described above. The turn-piece is then mounted in the retaining piece by pushing the shank 13 into the bore 31 of the slotted member 28 with the locking projections 22 received in the lateral portions 27 of the central hole 25 and pushing the turn-piece downwardly. The parts 29 of the slotted member 28 will be forced outwardly by the lower cylindrical portion of the shank until the shoulders 21 have passed the bottoms of the flats 32 so that the turn-piece is snapped into the retaining piece. The flats 32 will then be in engagement with the flats 20 and will releasably hold the turn-piece in position since the turn-piece cannot be lifted out again without forcing the shoulders 21 over the flats 32. The turn-piece will be releasably held in a position such that the locking projections will be aligned with the lateral portions 27 of the central hole 25 but may then be turned, by forcing the flats 32 apart, through 90° to bring the other pair of the flats 20 into engagement with the flats 32 on the retaining piece so that the locking projections 22 will be at right angles to the diameter on which the lateral portions 27 are arranged. The flats 32 can be forced apart, deforming the material of the parts 29, due to the clearance between the edge of the aperture 52 and the flats 36. The turn-piece is thus in a position in which it cannot be removed from the sheet 50 without being turned again through 90°.

The cam piece is snapped into position on the sheet 51 and it will be noted that the diameter on which the lateral portions 41 of the central aperture 39 in the cam piece are arranged is at right angles to the diameter on which the lateral portions 27 on the retaining piece are arranged. FIGURE 2 shows the lugs on both the retaining and the cam pieces in the same plane, the lugs 37 on the retaining piece being in line with the lateral portions 27 while the lugs on the cam piece are at right angles thereto. When the turn-piece has been turned through 90° after having been pushed through the retaining piece, therefore, the locking projections 22 are in a position to pass through the lateral portions 41 of the central hole 39 in the cam piece 12. The plates are then brought in face-to-face relation and the shank of the turn-piece pushed through the bore of the split bushing in the cam piece and it is then turned again through 90°. As the turn-piece is turned through 90°, the locking projections 22 will ride up the cam surfaces 44 which are inclined to the longitudinal axis of the shank and as a result will draw the shank 13 of the turn-piece into the bore of the split bushing 42 on the cam piece. As a result, the skirt 18 will be deformed as shown since its lower edge 19 will engage the flange 24 of the retaining piece. The skirt 18 acts as a Belleville washer and thus acts as spring means tending to resist the movement of the shank downwardly in FIGURE 2, i.e., into the bore of the split bushing of the cam member.

At the end of the 90° movement of the turn-piece, the locking projections 22 will seat in the detents 45 and thus the turn-piece will releasably be held in position.

It will be seen that with the turn-piece in this position the sheets 50 and 51 are held in face-to-face relation since the sheet 51 is engaged in the groove 47 in the cam piece and the turn-piece holds together the cam piece and the first sheet by engagement with the retaining piece.

To release the fastener, the turn-piece is turned through 90° to bring the locking projections 22 into alignment with the lateral portions 41 of the central aperture 39 in the cam piece 12 and the sheets may then be moved apart.

The fastener is particularly useful on a panel requiring a number of fasteners since the panel may have a number of retaining pieces 11 snapped into circular apertures therein and the turn-pieces pushed through the retaining pieces and each turned through 90°. The whole panel may then be offered up to its support which contains the cam pieces 12 and the locking projections 22 on the turn pieces will be in the right positions to enter the lateral portions 41 of the holes in the cam pieces. After the panel and support have been brought into face-to-face relation the cam pieces can be turned to hold the sheets together.

Figure 4:
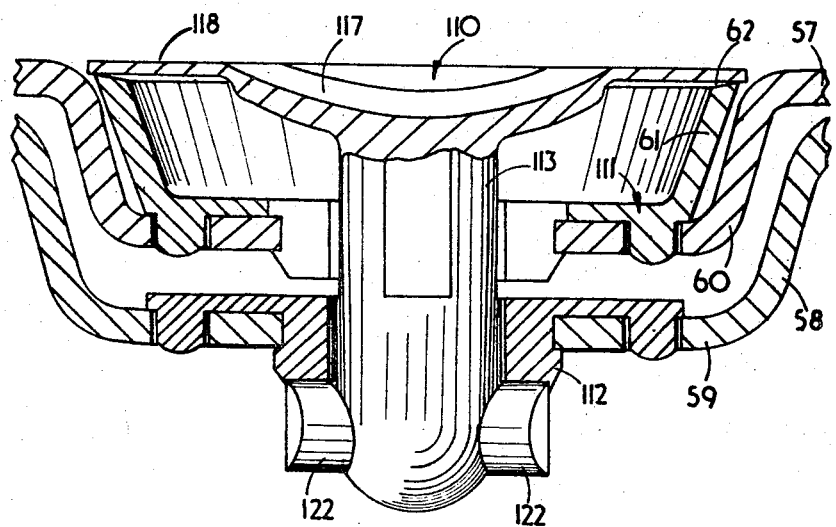
FIGURE 4 is a view similar to FIGURE 2 of the embodiment of FIGURE 3.

Referring now to FIGURES 3 and 4, the embodiment of the fastener there shown is designed for flush fitting and for holding together two sheets 57 and 58. The fastener differs from that shown in FIGURES 1 and 2 mainly in the construction of the retaining piece and in the head of the turn-piece and the same reference numerals with 100 added are used for parts in the embodiment of FIGURES 3 and 4 which are similar to parts in FIGURES 1 and 2.

The cam piece of FIGURES 3 and 4 is identical to that shown in FIGURE 1 and is indicated at 112 as being mounted in a dished portion 59 of the sheet 58. The retaining piece 111 in FIGURE 4 is mounted in a dished portion 59 of the sheet 57 and differs from the retaining piece 11 merely in the provision of an upstanding skirt 61 whose upper edge 62 is bevelled and is just below the level of the flat portion of the sheet 57. The retaining piece 111 is mounted in the portion 60 in exactly the same manner as described in relation to FIGURES 1 and 2 for the retaining piece 11.

The turn-piece 110 differs from the turn-piece 10 only in the fact that the skirt 18 is replaced by a flat disc 118 which engages, as shown in FIGURE 4, with the upper edge 62 of the upstanding skirt 61 on the retaining piece 111. The head of the turn-piece 110 has a slot 117 whereby the turn-piece may be turned by a screw driver or coin as described above.

The operation of the fastener of FIGURES 3 and 4 is similar to that described in relation to FIGURES 1 and 2 but the cam piece 112 and the retaining piece 111 are mounted on the respective plates 58 and 57. The turn-piece is then mounted in the retaining piece 111 as described. The sheets are then brought into face-to-face relation and the shank 113 of the turn-piece 110 pushed through the bore in the cam piece 112 and turned as before so that the locking projections 122 engage the cam surfaces 144 on the cam piece. As the turn-piece is forced into the bore in the split bushing of the cam piece, the disc 118 is bowed downwardly and thus acts a spring washer tending to resist the movement of the shank 113 into the bore in the cam piece. The turn-piece is turned through 90° until the locking projections 122 engage in the detents 145 as described above. It will be seen that the arrangement described is suitable for flush fitting since, when the fastener is in use, the disc 118 is substantially flush with the upper surface of the sheet 57.

Referring now to FIGURES 5 and 7 these illustrate fasteners similar to that shown in FIGURE 1 but having handles for turning the turn-piece; FIGURE 6 shows a form of handle.

Referring to FIGURE 5, the fastener there shown is in many respects identical to that shown in FIGURE 1 and the parts indicated in FIGURE 5 which are identical to parts in FIGURE 1 are given the same reference numerals with the addition of 200, e.g., the piece 10 in FIGURE 1 is 210 in FIGURE 5.

The turn-piece 210 is the same as the turn-piece 10 except that formed in the shank 21 of the turn-piece is a bore indicated generally at 150. The bore is of hexagonal cross section and terminates at its lower end in a rounded end 151 and opens at its upper end through a hole 152 in the head. Formed approximately two-thirds of the way down the bore 150 is an inwardly projecting shoulder 153, the bore being cylindrical for a short distance above the shoulder and being cylindrical below the shoulder to the rounded end 151.

A handle member for use with the fastener is indicated generally at 154 and comprises a spigot indicated generally at 155 having an upper portion 156 of hexagonal cross section and a lower portion 157 of cylindrical cross section and which terminates in a rounded end 158. A short distance below the hexagonal portion 156 of the spigot there is provided a groove 159.

The upper end of the spigot is provided with a cross piece indicated generally at 160. The cross piece is shaped to be complementary to the shape of the head 215 and has ribs 161 which engage, when the handle member is in position, in the slot 217 in the head. The wings 162 of the cross piece lie above the skirt 218.

In use, the handle member 154 is assembled with the turn-piece 210 by entering the spigot 155 into the bore 150 and pushing the spigot down until the shoulder 153 snaps into the groove 159. Due to the resilient nature of the material from which the turn-piece 210 is made, the rib 153 is deformed by the rounded portion 157 of the spigot as the latter is pushed down and then springs into the groove 159. Preferably the handle member is also made of resilient synthetic resinous material and this assists in springing of the shoulder 153 into the groove 159.

The width across the extremity of the wings 162 is substantially equal to the diameter of the skirt 218 so that the handle member does not project radially outwardly from the spigot by a distance greater than does the skirt 218.

The retaining piece 211 is identical to the retaining piece 11 except that only one lug 237 is provided instead of the two lugs 37. Moreover the lateral portion 227 of the hole 225 nearest to the lug 237 has a sharp end 227a defined by two inclined edges 227b so as to indicate to a person installing the fastener that the lug 237 is adjacent the end 227a.

The cam piece 212 is identical to the cam piece 12 except that only one lug 249 is provided and that the flange 238 has a generally curved edge portion 238a and two inclined edge portions 238b terminating in a pointed end 238c. The pointed end indicates to an installer of the fastener the location of the lug 249.

The use and operation of the fastener of FIGURE 5 is identical to that of FIGURE 1 except that the turnpiece 212 is turned by the handle member 154 instead of by a coin or screwdriver as in FIGURE 1.

FIGURE 6, shows an alternative form of handle member which may be associated with the turnpiece. The handle member is indicated generally at 163 and comprises a spigot indicated at 164. The spigot has an upper portion 165 which is of hexagonal cross section and a lower rounded end 166. A short distance below the bottom of the hexagonal part 165 of the spigot is a groove 167.

At its upper end the spigot 164 is formed with a comparatively long lever 168 having a curved upper surface which is formed with a flange 169. The lever 168 merges with the shank 165 through a disc 170 and below the disc, and extending radially from the upper end of the shank, are a pair of ribs 171.

The handle member of FIGURE 6 is employed in a manner similar to the handle member in FIGURE 5. That is to say the spigot member 164 of the handle member is entered into the bore 150 of the turnpiece 212 and is pushed down until the shoulder 153 in the bore of the turnpiece engages the groove 167 in the spigot. In this position, the ribs 171 engage in the slot 217 in the head of the turnpiece.

It will be seen that with respect to both the handle member of FIGURE 5 and the handle member of FIGURE 6 there are first complementary means of the handle member and the turnpiece which releasably retain the handle member in position. These first complementary means comprise the shoulder 153 in the bore of the turnpiece and the groove 159 or 167 in the shank of the handle member. There are also second complementary means on the handle member and the turnpiece which prevent relative rotation therebetween. These second complementary means comprise the engaging surfaces of the hexagonal parts 155 and 165 of the shanks of the handle members and the corresponding hexagonal surfaces of the bore 150 of the turnpiece. The second complementary means also include the slot 217 in the head of the turnpiece and the ribs 161 and 171 on the handle members.

In a modification of the invention, not shown, the bore 150 in the turnpiece could be made of circular cross section as could the whole of the shank 155 or 164 of the handle member. The second complementary means for preventing rotation between the turn-piece and the handle member would then be constituted solely by the ribs 161 or 171 and the slot 217, the first complementary means still consisting of the shoulder 153 and the groove 159 or 167.

Preferably, where the bore 150 in the turn-piece is made of hexagonal section, the section is such as to be complementary to a standard hexagonal key. Such a key is indicated at 173 in FIGURE 7 and has a portion 174 which is engaged in the bore 150 whereby the turn-piece can be turned by acting on the portion 175 of the key.

FIGURE 7 also shows the releasable fastener of FIGURE 5 used to hold two plates 250 and 251 in face-to-face relation. Its operation is identical to the operation of the fastener described in relation to FIGURES 1 and 2 except for the means for turning the turn-piece and will not further be described.

A suitable material for making the turn-piece, and the handle members is the acetal resin known as Delrin 507 (trademark). The retaining piece and cam piece are conveniently made from nylon.

It will be seen that the invention provides a simple releasable fastener which may conveniently be made from a resilient, synthetic resinous material and which is also arranged that the cam piece does not require to be rivetted or threadedly engaged with the sheet on which it is mounted.

I claim:
1. A releasable fastener for holding together apertured first and second sheets in face-to-face relation and comprising a retaining piece to be mounted on the first sheet, a turn piece carried by the retaining piece and a cam piece to be mounted on the second sheet for engagement by the turn piece; the turn piece comprising a shank, a head at one end of the shank for engaging said retaining piece and at least one locking projection, comprising locking means, extending outwardly from the shank adjacent the other end thereof; the retaining piece and the cam piece each consisting of a single piece of resilient, synthetic resinous material which presents a flange having a hole therein which has a central portion dimensioned to give passage to said shank and a lateral portion dimensioned to give passage to said locking means, a slotted member projecting from a flange and providing a split bushing with the bore of said bushing in alignment with said central portion and the slot in the member in alignment with said lateral portion, a groove in the outer surface of the bushing between the flange and the end of the bushing remote therefrom, the parts of the bushing being capable of being sprung towards one another so that said end may be sprung through the aperture in the sheet on which the piece is carried and the edge of said aperture received in the groove, and lug means on the flange for engaging means on said sheet to prevent the piece rotating relative thereto when mounted thereon; the cam piece additionally having a cam surface on the end of said slotted member remote from the flange and inclined to the longitudinal axis of the shank to engage the locking means after the latter has entered the slot in said member and the turn-piece has been subsequently turned; engagement of the locking means with the cam surface drawing the shank of the turn-piece into said bore, and spring means being provided to resist the drawing of the shank into the bore.

2. A releasable fastener according to claim 1, wherein said other end of the shank is larger than said bore and may be pushed through the bore so as to snap the turnpiece into position in the retaining piece.

3. A releasable fastener according to claim 1 wherein the spring means comprises a resilient, conical skirt on the head of the turn-piece to engage the retaining piece when the fastener is in use.

4. A releasable fastener according to claim 3 wherein the turn-piece and said skirt are constituted by a single piece of resilient, synthetic resinous material.

5. A releasable fastener according to claim 1 wherein said shank is generally cylindrical and is formed with a plurality of circumferentially spaced, axially-extending flats terminating in shoulders adjacent said other end of the shank, the retaining piece having flats in the bore of its bushing complementary with, and engaging, the flats on the shank, the flats in said bore engaging the shoulders to releasably hold the shank in the bore.

6. A releasable fastener according to claim 5 wherein said complementary flats are so positioned as to locate the turn-piece in any one of a number of positions relative to the retaining piece, in one of said positions the locking means being aligned with the slot in the bushing of the retaining piece and in another of said positions the locking means being at right angles to said slot.

7. A releasable fastener according to claim 1 wherein the cam surface has a detent to receive the locking means to releasably hold the latter at right angles to the slot in the bushing in the cam piece.

8. A releasable fastener according to claim 1 wherein the retaining piece includes a skirt extending from the flange thereof and the spring means comprises a resilient disc carried by the head of the turn-piece for engagement with said skirt when the shank of the turn-piece is drawn into the bore of the cam piece.

9. A releasable fastener according to claim 8 wherein the turn-piece and said disc are constituted by a single piece of resilient, synthetic resinous material.

10. A releasable fastener according to claim 1, wherein the shank of the turn-piece has a bore therein parallel to the longitudinal axis of the shank and which terminates in an aperture in the head, and wherein means is provided in the bore to prevent relative rotation between the turn-piece and a handle member inserted into the bore.

11. A releasable fastener according to claim 1, wherein the shank of the turn-piece has a bore therein parallel to the longitudinal axis of the shank and which terminates in an aperture in the head, the fastener also including a handle member associated with the turn-piece, a spigot on the handle and received in the bore of the turn-piece, complementary means of said bore and spigot releasably to retain the spigot in the bore and second complementary means of the turn-piece and the handle member which engage to prevent relative rotation between the turn-piece and the handle member.

12. A releasable fastener according to claim 11 wherein the first complementary means comprises a shoulder in the bore in the turn-piece arranged resiliently to engage with a groove on the spigot.

13. A releasable fastener according to claim 11, wherein the second complementary means comprises inter-engaging, non-circular surfaces on the spigot and in the bore in the turn-piece.

14. A releasable fastener according to claim 13, wherein said spigot and the bore in the turn-piece are both hexagonal in cross section.

15. A releasable fastener according to claim 11, wherein the second complementary means comprises a slot in the head of the turn-piece engage by rib means on the handle member.

16. A releasable fastener according to claim 11, wherein the handle member does not extend radially outwardly from the longitudinal axis of the shank further than the head of the turn-piece.

17. A releasable fastener according to claim 11, wherein the handle member does extend radially outwardly from the longitudinal axis of the shank further than the head of the turn-piece.

18. The combination of apertured first and second sheets and a releasable fastener for holding the sheets in face-to-face relation and comprising a retaining piece mounted on the first sheet, a turn-piece carried by the retaining piece, and a cam piece mounted on the second sheet for engagement by the turn-piece; the turn-piece comprising a shank, a head at one end of the shank, and at least one locking projection, comprising locking means, extending outwardly from the shank adjacent the other end thereof; the retaining piece consisting of a single piece of resilient, synthetic resinous material presenting a flange which engages one face of the first sheet and has a hole therein which has a central portion in which said shank is received and a lateral portion dimensioned to give passage to said locking means, a slotted member projecting from the flange and providing a split bushing which has been snapped into engagement with an aperture in the first sheet, the bore of the bushing being in alignment with said central portion and the slot in the member in alignment with said lateral portion, a groove in the outer surface of the bushing between the flange and said end in which is received the edge of said aperture, and lug means on the flange engaging aperture means in the first sheet to prevent the retaining piece rotating relative thereto; the cam piece consisting of a single piece of resilient synthetic resinous material presenting a flange which engages one face of the second sheet and has a hole therein which has a central portion dimensioned to give passage to said shank and a lateral portion dimensioned to give passage to hold said locking means, a slotted member projecting from the flange and providing a split bushing which has been snapped into engagement with an aperture in the second sheet, the bore of said bushing being in alignment with said portion and the slot in the member in alignment with said lateral portion, a cam surface on the end of the bushing remote from the flange and inclined to the longitudinal axis of the shank to engage the locking means after the latter has entered said lot and the turn-piece has been subsequently turned, a groove in the outer surface of the bushing between the flange and said end in which is received the edge of said aperture and lug means on the flange engaging further aperture means in the second sheet to prevent the cam piece rotating relative thereto; engagement of the locking means with the cam surface after the shank has been passed through the bore in the bushing of the cam piece drawing the shank of the turn-piece into said bore and forcing the head of the turn-piece against the retaining piece and thus drawing the sheets together; spring means being provided to resist the drawing of the shank into the bore.

19. The combination according to claim 18 wherein the spring means comprises a resilient, conical skirt on the head of the turn-piece which engages the retaining piece, the turn-piece and said skirt being constituted by a single piece of resilient, synthetic resinous material.

20. The combination according to claim 18 wherein the shank of the turn-piece has a bore therein parallel to the longitudinal axis of the shank and which terminates in an aperture in the head, the bore in the turn-piece being non-circular in cross section to receive a portion of complementary section of a member for turning the turn-piece.

21. The combination according to claim 20, wherein the bore in the turn-piece is hexagonal in cross section.

22. The combination according to claim 20, in association with a handle member having a spigot received in the bore and of a cross section complementary to the cross section of the bore.

23. The combination according to claim 22 wherein the handle member has rib means which engage with a slot in the head of a turn-piece.

No references cited.

BOBBY R. GAY, *Primary Examiner.*

E. SIMONSEN, *Assistant Examiner.*